Oct. 28, 1930.　　　W. H. DAY　　　1,780,006

INDEX OR FILE

Filed July 27, 1925　　2 Sheets-Sheet 1

Inventor
William H. Day
Henry E. Pocknell
Attorney

Oct. 28, 1930.　　　W. H. DAY　　　1,780,006
INDEX OR FILE
Filed July 27, 1925　　2 Sheets-Sheet 2

Inventor
William H. Day
By Henry E. Rockwell
Attorney

Patented Oct. 28, 1930

1,780,006

UNITED STATES PATENT OFFICE

WILLIAM H. DAY, OF EAST HAVEN, CONNECTICUT, ASSIGNOR, BY MESNE ASSIGNMENTS, TO REMINGTON RAND INC., OF NEW YORK, N. Y., A CORPORATION OF DELAWARE

INDEX OR FILE

Application filed July 27, 1925. Serial No. 46,336.

This invention relates to indexes, files or indicators of that type in which a holder or carrier is employed to receive and mount a series of overlapping index elements or record bearing members of the type generally termed visible indexes, wherein a margin of each card of the index is exposed to view for the purpose of identification regarding the data contained upon the remainder of the card, or to allow ready and clear visibility of the data upon the margin so exposed. The carrier or holder is usually provided with some arrangement of index element engaging members, guides or retaining means by which the record-bearing members are held in position thereon, and usually detachably so, while the carriers are either swingingly mounted upon a supporting frame to be manipulated similarly to the leaves of a book, as shown in the U. S. patent to R. D. Hayes, No. 1,223,168, granted April 17, 1917, or made in the form of a panel adapted to be slidingly inserted in a filing cabinet.

Holders of the above character have generally been provided with a flange along the outer edge thereof, either to act alone as a finger grip or as such a grip while at the same time covering the side edges of the series of index elements to protect the same from mutilation or being soiled. This structure tended to increase the cost of manufacturing the holders as well as to increase the amount of room required for a plurality of such holders, due to the increased thickness of the same at this point.

In some instances, the holders were constructed in such a manner that they lacked the necessary stiffness required to be properly and effectively manipulated, due to the flimsiness of the holder framing and lack of support for the front edge of the same. This was especially true when the holder was formed from a single sheet of metal which merely had a bent-over edge along the front thereof. This thin edge was also a disadvantage in that the operator was not provided with a means allowing a firm grip upon the edge, causing the possibility that the fingers would occasionally slip therefrom and cause delay in the use thereof.

In other cases, these holders were limited to a certain number of reference-bearing members mounted thereon, due to the necessity of providing supporting ears at the lower edge of the same, the ear being of such design and applied in such a manner that a comparatively large amount of holder surface was not in use as an index element support.

The principal object of this invention, therefore, is to provide an improved index holder or carrier of the above type, which will be of such construction and combination and arrangement of the parts thereof, that the above mentioned disadvantages will be overcome while retaining all of the advantages, decreasing the cost of manufacture and increasing the efficiency in the use of the same.

Another object of this invention is to provide a carrier for index elements of the above type, with a novel frame construction which will be light in weight and easily manipulated, while being of sufficient stiffness to properly stand the strain of constant use without becoming distorted.

Another object of this invention is to so arrange the index element retaining means used in the frame portion of a carrier of this type that the index elements will be protected against mutilation without the use of a side flange or the like, in order to reduce the combined thickness of a plurality of such holders to a minimum.

Still another object of this invention is to provide index element supporting means of novel construction by the use of which more of such elements may be mounted thereon than formerly, thereby increasing the capacity of the index as a whole.

Still another object of this invention is to provide a combination of a retaining means and a supporting means for use with such a type of holder that the latter will cooperate with the frame to form an efficient device of this character whereon index elements may be readily applied, as readily removed, positively positioned and securely supported thereon while allowing a maximum quantity of such elements to be held thereby.

To these and other ends the invention consists in the novel features and combinations of parts to be hereinafter described and claimed.

For the purpose of illustrating my invention, I have selected the general form of swinging leaf described in the patent to R. D. Hayes above referred to, and have selected the form of index elements used and described in connection with that form of leaf and which are of the type shown and described in the patent to Irving Fisher, No. 1,048,056, dated December 24, 1912.

The particular form of leaf illustrated is somewhat similar in structure to the one described in the patent to William H. Day, No. 1,446,839 dated February 27, 1923, and in some aspects is an improvement thereover.

Figure 1:
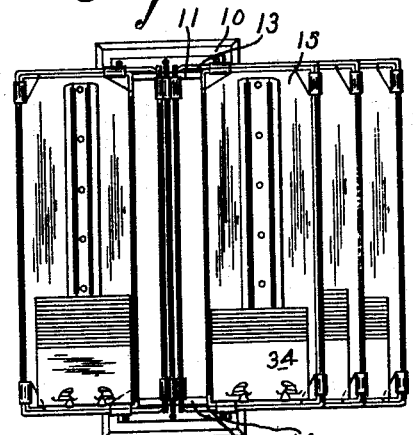
Fig. 1 is a front elevation of an index or file, embodying my improvements, showing the carriers hingedly supported to swing as leaves.
Figure 2:
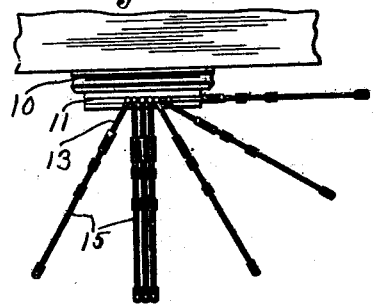
Fig 2 is a top plan view of the parts shown in Fig. 1.
Figure 3:
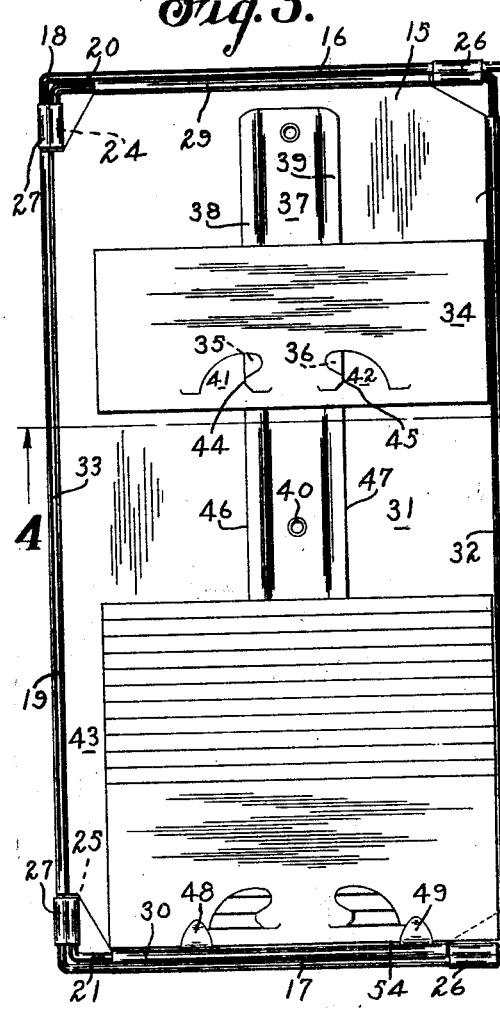
Fig. 3 is a side elevation or side face view of one of the carriers or leaves.
Figure 8:
Fig. 8 is a section on line 8—8 of Fig. 5.

A plurality of leaves embodying the features of this invention is shown in Fig. 1, mounted upon a supporting means comprising a rack 10, provided with so-called upper and lower tracks 11 and 12, which are slidingly engageable by certain portions of each leaf 15, in this instance, the upper and lower arms 13 and 14, to swingingly support the same. The leaf 15 comprises a framework of wires or rods, bent into such form that a rectangularly-shaped open frame is provided. In this instance, the preferred form of frame is formed by bending the end portions 16 and 17 of a rod or wire 18 at right angles to the remaining portion 19 and terminating the same beyond the frame into the form of the arms 13 and 14, for the purpose above noted. Portions 20 and 21 of another wire or rod 22 are bent at right angles to the remaining portion 23 thereof, and the end portions 24 and 25 of this rod are bent at right angles to the respective portions 20 and 21. The end portions 24 and 25 extend toward each other and are substantially parallel with the portion 23. The rod 22, bent as above, is adapted to cooperate with the rod 18 to form the enclosed loop forming the open rectangularly-shaped frame by having the portions 20 and 21 closely associated with portions 16 and 17, as shown in Fig. 3. The end portions 24 and 25 are closely associated with the portion 19 of the rod 18. The portions 20 and 21 and 16 and 17 are tied together, in this instance, by means of the sleeves 26 which partially surround both, as shown in Fig. 3. Likewise, the end portions 24 and 25 are tied to the portion 19 by similar sleeves 27 shown also in Fig. 8. By the above construction a very rigid frame structure is provided, the members of which are securely fastened together in such a manner that each component braces the other, both laterally and longitudinally.

A thin sheet of material 28, which to obtain the desirable lightness in weight, is preferably made of aluminum, is secured between the components of the frame. The edges 29 and 30 of the sheet or base plate 28 are rolled over the wire or rod portions 20 and 21, and the edge 32 thereof is rolled over the wire or rod portion 23. The remaining edge 33 of the sheet of material 28 is rolled over the portion 19 of the wire or rod 18. These edges are rolled over the wire or rod at the above mentioned points in such a manner that the sheet or base-plate 31 lying between the various frame portions is in the plane of the horizontal center lines of the wires or rods, as clearly shown in Figs. 4, 6, 7 and 10, whereby the wires or rods form what may be termed a bead which surrounds the base-plate 31 at the outer edge thereof.

The portion of the bead above mentioned, which is formed by the rod portion 19 at the front edge of the leaf is of especial utility in connection with this invention, inasmuch as the same forms a finger grip for use in the manipulation of the leaves to swing the same when they are mounted upon a support or rack 10, or to draw them in and out of a cabinet when slidingly mounted in such a device.

The index elements or cards 34 are mounted upon the leaf by means of the cooperation of the oppositely and laterally directed tongue portions 35 and 36 thereof, with a retaining member 37, by engaging beneath the raised edge portions 38 and 39 thereof. The strip or retaining member 37 is mounted upon the base-plate 31 by any suitable means, such as eyelets 40, and the raised edge portions 38 and 39 present oppositely and laterally directed flanges which extend, in this instance, away from each other. To insure proper cooperation of the tongues 35 and 36 of the elements 34, with these edge flanges, the tongues are reversely extended relatively to the strip raised edges 38 and 39, in a direction toward each other. A reverse order, of course, is possible. Other tongue portions 41 and 42 are provided in the index elements 34, whereby each of the same nests with adjacent ones, as described in the above mentioned Fisher patent. Both sides of the base plate are used to support cards 34 and for this purpose two strips 37 are used, one on each side of the base plate 31, each of which are arranged in back-to-back relation and secured to the base plate by the same tubular rivets.

The retaining strip 37 is preferably secured to the base-plate 31, slightly off the longitudinal center line thereof, toward the rear edge, in order that a front edge margin 43 will be provided and that the index elements mounted thereon will be spaced from the beaded front edge of the leaf. The margin 43 cooperates with the beaded front edge of the leaf or frame to facilitate the use of the bead as a finger grip by spacing the same from the adjacent side edges of the index elements mounted thereon, and insures that the index elements will not be soiled or otherwise mutilated when the leaves are manipulated.

The above-mentioned cooperation between the index elements 34 and the retaining strip 37 is such that the elements 34 are free to slide longitudinally along the strip 37 and be guided in such movement thereby, due to the engagement of the tongue portions 35 and 36 with the raised edge portions or flanges 38 and 39. Relative lateral movement between the elements 34 and the strip 37 is prevented by the provision of other cooperating portions of both. Vertically disposed edges 44 and 45 are provided associated with the elements 34 which engage against the outer free edges 46 and 47 of the flanged edge portions 38 and 39 of the strip 37, when the elements are mounted thereon, and prevent the relative lateral movement by such engagement.

Figure 5:
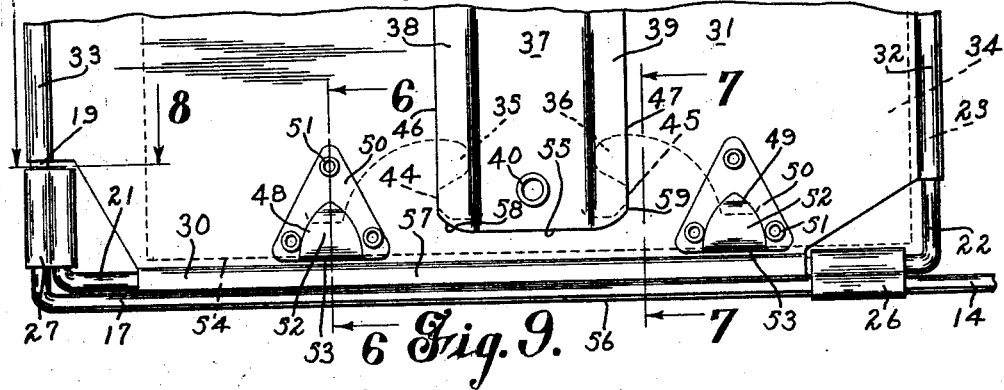
Fig. 5 is an enlarged view of the bottom portion of the side face of the carrier shown in Fig. 3.

Inasmuch as the elements 34 are capable of sliding movement along the retaining guide member 37, it is desirable that provision be made especially in leaves or panels adapted for use in a vertical position, to retain the index elements against slippage downwardly and from the leaf. For this purpose, I have selected a pair of members or ears 48 and 49, the preferred form of which is shown in Figs. 3, 5, 6, and 7. The ear members 48 and 49 are preformed from a blank of material, preferably metal, and comprises a base portion 50 adapted to be suitably secured to the plate 31, such as by means of eyelets 51. A portion 52 of these ear members is turned up and over the base portion 50, forming at the bend 53 a supporting shoulder to engage the edge 54 of the lowermost index element of a series, as shown in Figs. 1, 3, and 5; the index element 34 in Fig. 5 being shown in dotted lines.

In order that a maximum number of index elements may be applied to and mounted upon a leaf of a given size, it is desirable that the ears 48 and 49, or at least the supporting portion 53 thereof, be located as near the lower edge of the leaf as is possible, while retaining the efficiency in the use of the same. It is necessary that the lower end 55 of the index element retaining and guide member 37 be spaced from the extreme lower edge 56 of the leaf an amount sufficient to allow the tongue portions 35 and 36 of the index element 34 to slip from under the flanges 38 and 39, respectively, when said element is removed from the guide 37 at this point after disengagement from ears 48, 49, without the tongue portions being mutilated, distorted or prevented from such operation by engagement with the bead 57 formed by the wire or rod portions 17 and 21, and the enclosing plate edge 30. To facilitate removal of the element from the guide strip, the flanged portions thereof are rounded at this end as at 58.

As above mentioned, there is a cooperation between the element 34 and the guide strip 37, whereby these parts are prevented from laterally shifting relatively to each other by means of the engagement of the vertically disposed edges 44 and 45 of the element with the edges 46 and 47 of the strip. It is, of course, important that this cooperation be continued throughout the entire length of the strip 37 and affect each of the index elements of the series. The lowermost element, therefore, must be so located with respect to the terminating point 59 of the edges 46 and 47, of the strip 37, that the vertical edges 44 and 45 thereof will at all times be efficiently engaged. The vertical edges 44 and 45 are predeterminably located in respect to the marginal edge 54 of the index element 34 and for a certain type and size of element are standard in this location. It is, therefore, necessary to so locate the marginal edge 54 of the element in respect to the terminating point 59 and the flanges, that proper engagement will be maintained between the edges 44 and 45, and 46 and 47, respectively. This is accomplished by properly locating the supporting shoulder formed by the bend 53 in the ears 48 and 49, with respect to the lower edge 55 of the retaining strip 37. The supporting shoulder formed by the bend 53, therefore, must be spaced from the terminating point 59, which constitutes the effective end of the flanges 38 and 39 an amount no greater than the vertical spacing between the edges 44 and 45 and the margin 54 of the index element 34.

Figure 6:
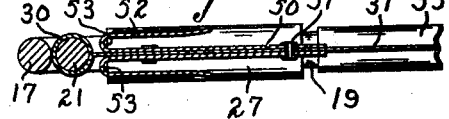
Fig. 6 is a section on line 6—6 of Fig. 5.
Figure 7:
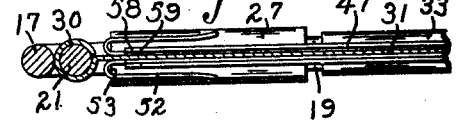
Fig. 7 is a section on line 7—7 of Fig. 5.
Figure 10:
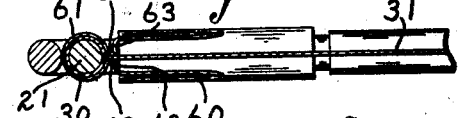
Fig. 10 is a section on line 10—10 of Fig. 9.
Figure 4:
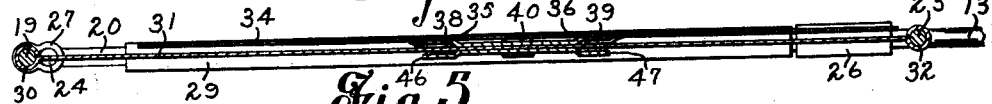
Fig. 4 is a section on line 4—4 of Fig. 3.
Figure 9:
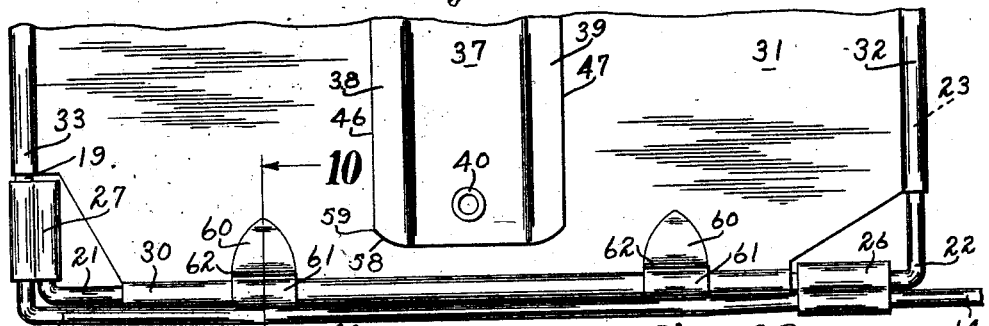
Fig. 9 is a view similar to Fig. 5, with a carrier having the position of the retaining member changed and a modified form of an associated part.

Due to the form of supporting ear shown and described above, being adapted for application to a surface by means of the base 50, it is necessary, in order to support a series of index elements on both sides of the leaf, to secure a pair of ears to each side thereof, as shown in Figs. 6 and 7. Figs. 9 and 10 illustrate a somewhat modified form of element-supporting ears 60. In this form the base 50, above mentioned, is not required, as the opposite ears upon both sides of the leaf are formed from the same piece of material as shown in Fig. 10, and are connected by the portion 61, which is wrapped about the base-plate edge 30. The portion 61 substantially surrounds the wire or rod portion 21 and its surrounding base-plate edge 30, and is crimped at 62 into more or less close contact with the base-plate 31, adjacent this edge, whereby a shoulder 63 is formed which is analogous in use and construction to the supporting shoulder formed by the bend 53 above described, in connection with the ears 48 and 49.

Figures 11, 12, 13:
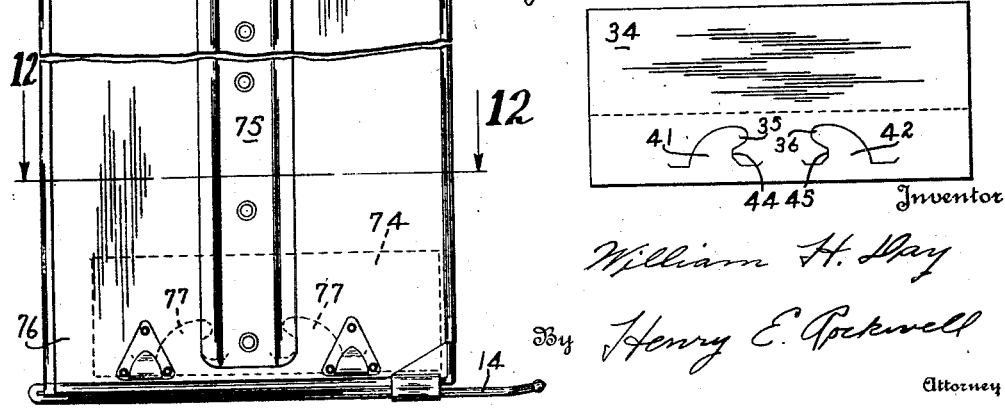
Fig. 11 is a side face view of a somewhat modified form of carrier, embodying certain features of this invention.
Fig. 12 is a section on line 12—12 of Fig. 11.
Fig. 13 is a detailed view of the form of index element adapted for use with a carrier of the form illustrated.

Figs. 11 and 12 illustrate a leaf 70 wherein the frame portion 71 is formed of but one wire or rod and the front edge 72 of the base-plate 73 is bent back upon itself to form a bead for the same use as above described. As shown in dotted lines in Fig. 11, an index element 74 may be mounted upon a leaf in a somewhat similar manner, as previously described regarding element 34, with the exception that the retaining strip 75 is, in this instance, located at the longitudinal center of the leaf. In order to obtain the finger-gripping and element edge protecting space 76, the tongues 77 of the index element 74 are struck up out of the material forming the same sufficiently off the longitudinal center thereof to cause the body of the element or card to assume a position off the longitudinal center of the leaf.

What I claim is:

1. In an index or file, an index element carrier, comprising a base-plate, a frame surrounding and secured to said base-plate, and means associated with said base plate and index elements to support index elements of card-like form flatwise in overlapped relation with a margin of each exposed to view upon said plate, said means being adapted to retain said card-like elements off the longitudinal center of said frame, whereby a longitudinally extending uncovered margin is formed along one of the longitudinal edges of said carrier as and for the purpose described.

2. In an index or file, an index element carrier, comprising a base-plate, a frame surrounding and secured to said base-plate, said frame being adapted to present a bead-like edge along at least one longitudinal edge of said carrier, and means associated with said base plate and index elements to support index elements of card-like form flatwise in overlapped relation with a margin of each exposed to view upon said plate, said means being adapted to retain said card-like elements off the longitudinal center of said frame, whereby a longitudinally extending uncovered margin is formed along and adjacent to the beaded edge of said carriers as and for the purpose described.

3. In an index or file, an index element carrier, comprising a base-plate, a frame surrounding and secured to said base-plate, and an oppositely-directed-flanged index element holder secured to each face of the base-plate, and adapted to support said holders directly opposite each other, back to back, and spaced farther from one longitudinal edge of the carrier than from the other.

4. In an index or file, an index element carrier, comprising a base-plate, a frame surrounding and secured to said base-plate, and an oppositely-directed-flanged index element holder secured to each face of the base-plate, said holders being mounted directly opposite each other, back to back, and securing means passing through the base-plate and both of said holders.

5. In an index or file, an index element carrier provided with means to support a series of overlapping card-like index elements thereon, said means comprising a strip having laterally directed flanges extending longitudinally of said carrier and terminating short of one end thereof, and an ear having a forwardly directed flange portion forming a shoulder to engage one of said card-like elements to prevent the same from disengagement with said strip.

6. In an index or file, an index element carrier of one of the types described having a bead-like lateral edge, and provided with a supporting strip for index elements of card-like form, said strip extending longitudinally along said carrier and terminating short of said bead-like edge, and an index element edge engaging member comprising a forwardly turned flange forming a shoulder secured to said carrier adjacent said bead-like edge and spaced below the terminating point of said strip.

7. In an index or file, an index element carrier of one of the types described having a thickened lateral edge and provided with a supporting strip for index elements of card-like form, said strip extending longitudinally along said carrier and terminating short of said edge, an index element mounted upon said strip, said element being provided with means to engage said strip, said means being spaced above a margin of said element, and means to support said element against slippage from said strip including a forwardly directed shoulder located adjacent said carrier edge, said shoulder being spaced from the terminating point of said strip an amount no greater than the amount said strip-engaging means of said element is spaced from the margin thereof to insure proper engagement thereby with said strip.

8. In an index or file, an index element carrier of one of the types described, provided with a supporting strip for index elements of card-like form, said strip extending longitudinally along said carrier and terminating short of an edge of the same, an index element mounted upon said strip, said element being provided with means to engage said strip, said means being spaced above a margin of said element, and means to support said element against slippage from said strip, including a forwardly directed shoulder, said shoulder being spaced from the terminating point of said strip an amount no greater than the amount said strip-engaging means of said element is spaced from the margin thereof to insure proper engagement thereby with said strip.

9. In an index or file, an index element carrier, comprising a base-plate, a frame surrounding and secured to said base-plate, and means to support index elements of card-like form flatwise in overlapped relation with a margin of each exposed to view upon said plate, and with said elements disposed off the longitudinal center of said frame, whereby a longitudinally extending uncovered margin is provided along one of the longitudinal edges of said carrier, as and for the purpose described.

In witness whereof, I have hereunto set my hand this 22 day of July, 1925.

WILLIAM H. DAY.